US 11,383,725 B2

United States Patent
Ribbens

(10) Patent No.: US 11,383,725 B2
(45) Date of Patent: Jul. 12, 2022

(54) DETECTING VEHICLE ENVIRONMENT SENSOR ERRORS

(71) Applicant: The Regents of the University of Michigan, Ann Arbor, MI (US)

(72) Inventor: William B. Ribbens, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 337 days.

(21) Appl. No.: 16/636,983

(22) PCT Filed: Aug. 14, 2018

(86) PCT No.: PCT/US2018/046715
§ 371 (c)(1),
(2) Date: Feb. 6, 2020

(87) PCT Pub. No.: WO2019/036475
PCT Pub. Date: Feb. 21, 2019

(65) Prior Publication Data
US 2020/0198650 A1 Jun. 25, 2020

Related U.S. Application Data

(60) Provisional application No. 62/605,429, filed on Aug. 14, 2017.

(51) Int. Cl.
*B60W 50/02* (2012.01)
*G07C 5/08* (2006.01)
(Continued)

(52) U.S. Cl.
CPC .... *B60W 50/0225* (2013.01); *B60W 50/0205* (2013.01); *G01S 11/00* (2013.01);
(Continued)

(58) Field of Classification Search
None
See application file for complete search history.

(56) References Cited

U.S. PATENT DOCUMENTS

| | | |
|---|---|---|
| 5,050,427 A | 9/1991 | Cote et al. |
| 2007/0067078 A1 | 3/2007 | Salman et al. |

(Continued)

FOREIGN PATENT DOCUMENTS

| | | |
|---|---|---|
| JP | 2006071473 A | 3/2006 |
| KR | 20050100990 A | 10/2005 |

OTHER PUBLICATIONS

International Search Report corresponding to International Application No. PCT/US2018/046715, dated Nov. 29, 2018, 3 pages.

(Continued)

*Primary Examiner* — Quan Zhen Wang
*Assistant Examiner* — Rajsheed O Black-Childress
(74) *Attorney, Agent, or Firm* — Reising Ethington P.C.

(57) ABSTRACT

A system and method of carrying out a remedial vehicle action in response to determining an error in a monitored vehicle sensor, the method include: determining a vehicle true velocity vector based on measurements from vehicle operations sensors; determining a monitored sensor velocity vector based on measurements from the monitored vehicle sensor; when it is determined that the vehicle true velocity vector is different than the monitored sensor velocity vector, then testing for a first component error, wherein the testing for the first component error includes calculating a first component error value based on a first component measured value and a first component corrected value, and when one or more measured vector components of the monitored sensor velocity vector are determined to be erroneous, them carrying out a remedial vehicle action.

19 Claims, 7 Drawing Sheets

(51) Int. Cl.
*G01S 11/00* (2006.01)
*H01M 10/48* (2006.01)
*G01S 13/931* (2020.01)

(52) U.S. Cl.
CPC ........ *G07C 5/0808* (2013.01); *H01M 10/488* (2013.01); *B60W 2050/0215* (2013.01); *B60W 2420/52* (2013.01); *B60W 2520/10* (2013.01); *G01S 13/931* (2013.01); *G01S 2013/9323* (2020.01)

(56) References Cited

U.S. PATENT DOCUMENTS

2008/0186223 A1\* 8/2008 Mayer ..................... G01S 7/032
342/109
2010/0295492 A1 11/2010 Chakrabarti et al.

OTHER PUBLICATIONS

Written Opinion corresponding to International Application No. PCT/US2018/046715, dated Nov. 29, 2018, 3 pages.

\* cited by examiner

DETECTING VEHICLE ENVIRONMENT SENSOR ERRORS

TECHNICAL FIELD

This invention relates to methods and systems for detecting and identifying errors and/or failures in vehicle environment sensors.

BACKGROUND

Over the service life of a vehicle, many components and subsystems can experience wear, damage, and other degradation over time. While various approaches may be used to identify certain failed components, other types of components may be more difficult to diagnose. It may also be difficult to identify which component or aspect of a vehicle environment sensor is erroneous or failing.

SUMMARY

According to one aspect of the invention, there is provided a method of carrying out a remedial vehicle action in response to determining an error in a monitored vehicle sensor the method including: determining a vehicle true velocity vector based on measurements from onboard vehicle sensors, determining a monitored sensor velocity vector based on measurements from the monitored vehicle sensor, the monitored sensor velocity vector including a plurality of measured vector components; when it is determined that the vehicle true velocity vector is different than the monitored sensor velocity vector, then testing for a first component error, the first component error being an error in a first measured vector component of the monitored sensor velocity vector, the first measured vector component being one of the plurality of measured vector components, and wherein the testing for the first component error includes: (i) calculating a first component error value based on a first component measured value and a first component corrected value, wherein the first component measured value is based on the measurements from the monitored vehicle sensor and the first component corrected value is derived from the vehicle true velocity vector, (ii) using the first component error value to obtain a first test vehicle velocity vector; (iii) comparing the first test vehicle velocity vector to a first component monitored sensor velocity vector, the first component monitored sensor velocity vector being derived based on the measurements from the monitored vehicle sensor; and (iv) when the first test vehicle velocity vector is within a predetermined threshold amount of the first component monitored sensor velocity vector, then determining that the monitored vehicle sensor is erroneous with respect to the first measured vector component of the monitored sensor velocity vector; and when one or more of the measured vector components of the monitored sensor velocity vector are determined to be erroneous, then carrying out a remedial vehicle action.

According to various embodiments, this method may further include any one of the following features or any technically-feasible combination of some or all of these features:

- determining a vehicle velocity vector error to be the first component error value when it is determined that the monitored vehicle sensor is erroneous with respect to the first measured vector component of the monitored sensor velocity vector, and wherein the remedial vehicle action includes adjusting measurements of the monitored vehicle sensor based on the vehicle velocity vector error;
- when the first test vehicle velocity vector is not within a predetermined threshold amount of the first component monitored sensor velocity vector, then testing for a second component error, the second component error being an error in a second measured vector component of the monitored sensor velocity vector, the second measured vector component being a second one of the plurality of measured vector components;
- either: the first measured vector component of the monitored sensor velocity vector is an azimuth angle as detected using a lidar unit or a radar unit, and the second measured vector component of the monitored sensor velocity vector is a range as detected using the lidar unit or the radar unit; or the first measured vector component of the monitored sensor velocity vector is the range as detected using the lidar unit or a radar unit, and the second measured vector component of the monitored sensor velocity vector is the azimuth angle as detected using the lidar unit or a radar unit;
- the testing for the second component error includes: calculating a second component error value based on a second component measured value and a second component corrected value, wherein the second component measured value is based on the measurements from the monitored vehicle sensor and the second component corrected value is derived from the vehicle true velocity vector; using the second component error value to obtain a second test vehicle velocity vector; comparing the second test vehicle velocity vector to a second component monitored sensor velocity vector, the second component monitored sensor velocity vector being derived based on the measurements from the monitored vehicle sensor; and when the second test vehicle velocity vector is within a second predetermined threshold amount of the second component monitored sensor velocity vector, then determining that the monitored vehicle sensor is erroneous with respect to the second measured vector component of the monitored sensor velocity vector;
- when the first test vehicle velocity vector is not within a predetermined threshold amount of the first component monitored sensor velocity vector and when the second test, vehicle velocity vector is not within a second predetermined threshold amount of the second component monitored sensor velocity vector, then carrying out a multi-component error determination process;
- the multi-component error determination process includes: estimating a first component multi-test value and a second component multi-test value; and testing a multi-component error hypothesis, wherein the testing of the multi-component error hypothesis includes: (i) obtaining it multi-component velocity vector error based on the first component multi-test value and the second component multi-test value, and (ii) determining whether the multi-component velocity vector error is less than a multi-component velocity vector error threshold;
- the first component multi-test value and/or the second component multi-test value are derived based on a first component next time estimate, a first component prior time estimate, a second component next time estimate, and a second component prior time estimate,
- when it is determined that the multi-component velocity vector error is less than the multi-component velocity vector error threshold, determining that a vehicle velocity vector error to be the multi-component velocity vector error, wherein the multi component velocity vector error includes a first error value corresponding to the first measured vector component of the monitored sensor velocity vector and a second error value corresponding to the second measured vector component of the monitored sensor velocity rector;

the onboard vehicle sensors include a vehicle speed sensor and a vehicle heading angle sensor;

the monitored vehicle sensor is a vehicle environment sensor;

the vehicle environment sensor includes either or both of a lidar unit and a radar unit; and/or a first component estimate matrix is derived from the vehicle true velocity vector and measurements front the monitored vehicle sensor, the first component estimate matrix including or being used to derive the first component corrected value.

According to another aspect of the invention, there is provided a vehicle failure detection system, including: a system under monitoring (SUM) that includes one or more vehicle environment sensors; one or more onboard vehicle sensors, the onboard vehicle sensors being separate from the one or more vehicle environment sensors; a failure detection module that includes a failure detection system (FDS) signal processor, and a memory containing a computer program, and a communication link between the failure detection model and the SUM; wherein the failure detection module is configured to execute the computer program that is stored in the memory of the vehicle failure detection system using the failure detection signal processor, and wherein execution of the computer program by the failure detection signal processor causes the failure detection module to: (i) determine a vehicle true velocity vector based on measurements from the one or more onboard vehicle sensors; (ii) determine a monitored sensor velocity vector based on measurements from the one or more vehicle environment sensors, the monitored sensor velocity vector including a plurality of measured vector components; (iii) when it is determined that the vehicle true velocity vector is different than the monitored sensor velocity vector, then test for a first component error, the first component error being an error in a first measured vector component of the monitored sensor velocity vector, the first measured vector component being one of the plurality of measured vector components, wherein the testing for the first component error includes calculating a first component error value based on a first component measured value and a first component corrected value, and wherein the first component measured value is derived based on the measurements from the vehicle environment sensors and the first component corrected value is derived from the vehicle true velocity vector; and (iv) perform a remedial vehicle action in response to the detection of an error in the one or more vehicle environment sensors.

According to various embodiments, this system may further include any one of the following features or any technically-feasible combination of some or all of these features:

the one or more vehicle environment sensors include either or both of a lidar unit and a radar unit;

the one of more onboard vehicle sensors are either or both of system sensors or supplemental sensors, wherein the supplemental sensors are a part of the failure detection module, and wherein the system sensors are either or both of sensors included as a part of the SUM or other system sensors;

the one or more onboard vehicle sensors include a vehicle speed sensor and a vehicle heading angle sensor;

the communication link is a direct, hardwired connection between the failure detection model and the SUM; and/or the communication link is a vehicle communications bus:

In other embodiments, the system and methods defined above can be utilized in other (non-vehicular) applications that involve an electronics-based system having sensors that provide the system state variable inputs needed to detect a failure of whatever component is being monitored.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Figure 1:
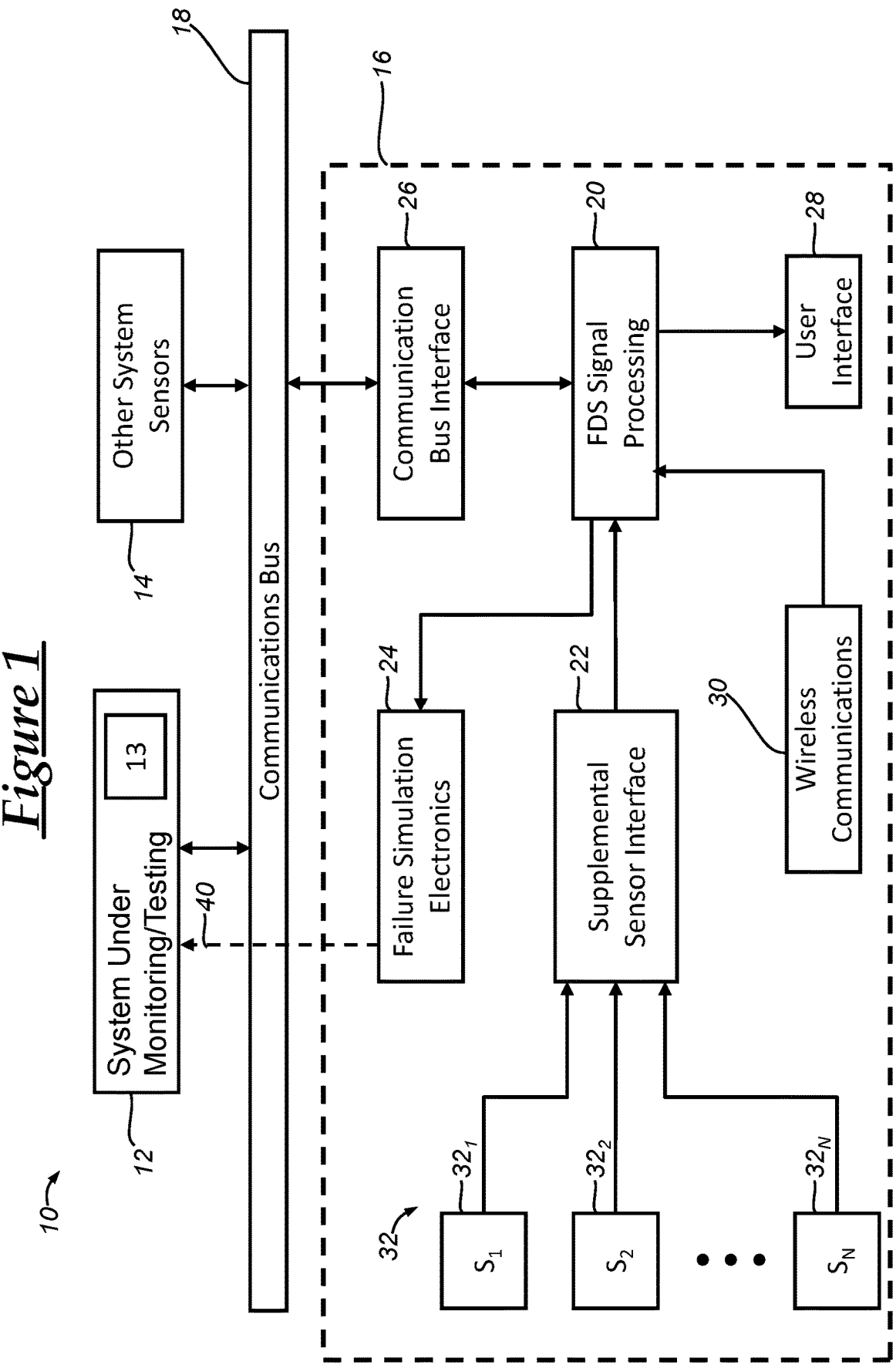
FIG. 1 is a block diagram of an embodiment of a failure detection system.

The system and method discussed below enables errors in a vehicle environment sensor tar other monitored vehicle sensor) to be detected and error values determined. In many embodiments, the errors in the vehicle environment sensor can be detected based on determining a vehicle true velocity vector and a monitored sensor velocity vector. The monitored sensor velocity vector refers to a velocity vector that is calculated based on measurements from the vehicle environment sensor, and the vehicle true velocity vector refers to a velocity vector that is calculated based on measurements from other vehicle sensors that are deemed to be more accurate than the vehicle environment sensor, such as one or more vehicle operations sensors (or other onboard vehicle sensors) that detect certain operation values for the vehicle. In an exemplary embodiment, the vehicle environment sensor can be (or include) a lidar unit (or lidar sensor) and/or a radar unit (or radar sensor). And, in the exemplary embodiment, the onboard vehicle sensors vehicle sensors can be a vehicle speed sensor (e.g., a wheel speed sensor) and a vehicle heading angle sensor, and can be separate from the lidar/radar unit (or other monitored vehicle sensor(s)).

The failure detection system (FDS) discussed below can be used to detect failures and/or degradation in vehicle electronic surveillance systems (e.g., a lidar/radar unit used for surveillance of the environment). In some scenarios, such surveillance systems are applicable in upper level autonomous vehicles for providing the data necessary for the onboard digital control system to react to conditions in the environment that affect the guidance system performance. In some embodiments, the FDS and the method below applies to certain lower level AVs by yielding a safety related environmental data that is often termed Bind Spot Detection (BSD).

The vehicle system to which the FDS can be applied can be an electronically scanned or an electromechanically scanned radar (radio detection and ranging) or lidar (light detection and ranging) unit. In one embodiment, a primary feature of the lidar/radar unit is the continues monitoring of objects within the field of view of the relevant surveillance system. This can involve providing the distance (range), the azimuth angle, and/or the elevation angle of an object relative to the vehicle coordinate system.

In some scenarios, as mentioned above, the vehicular surveillance systems are susceptible to errors in the range, azimuth, and elevation to objects within the field of view due to partial or complete component/part failure, software glitches, and changes in the environment around the vehicle, for example. Regardless of the source of error in lidar/radar data, there may be potentially hazardous consequences to the vehicle/occupant safety. Some embodiments below can be used to provide a means of precisely and accurately determining such errors. Moreover, depending upon the characteristics of the error, various embodiments can give guidance to maintenance personnel in repairing the lidar/radar unit, and/or for carrying out another remedial vehicle action in response to determining the source and/or magnitude of such errors.

With reference to FIG. 1, there is shown an embodiment of a failure detection system (FDS) 10. The FAS 10 includes a system under monitoring (SUM) 12, other system sensors 14, a failure detection module (FDM) 16, and a communication bus 18. The SUM 12 is the system (e.g., vehicle environmental sensor(s)) that is being monitored for current errors or failures. The SUM 12 can include zero or more SUM sensors 13 and, in the case that the SUM 12 includes one or more sensors, these sensors 13 can be system sensors. As used herein, "system sensors" includes sensors that are included in the SUM 12 or a part of the overall system 10 that are designed to cart, out the objectives and/or task(s) of the electronic system. In many embodiments, the SUM sensors can be environment sensors (or vehicle environment sensors) and, in one embodiment, the SUM 12 can include a lidar unit (or sensor) and/or a radar unit (or sensor), each of which is an example of an environment sensor. As used herein, an environment sensor (or vehicle environment sensor) is an onboard vehicle sensor that detects information concerning the environment surrounding the vehicle.

The other system sensors 14 are system sensors that are a part of the overall system 10, but are not a pan of the SUM 12. As an example, where the FDS 10 is being used on a vehicle to monitor one or more components of the vehicle, system sensors 13 and 14 would be a part of the OEM installed vehicle electronics that are used for vehicle operations, with sensors 13 being part of the component under monitoring (part of the SUM 12) and sensors 14 being part of the remaining vehicle electronics. In one embodiment, the sensors 13 can be a radar sensor and/or a lidar sensor, such as that which is installed on the front of a vehicle and facing in a forward direction.

The communication bus 18 is a hardwired electronic communication bus. However, it should be appreciated that the communication bus 18 can be any of a variety of electronic communication mechanisms, including those using wireless communications, as discussed more below. And, in some embodiments, the system 10 can include a hardwired communication bus 18, as well as a separate wireless communications module 30 that can be connected to the communication bus 18 and that can be used for communications within the system 10 and/or used with other external (o r remote) components (not shown).

The failure detection module (FDM) 16 is shown as including a failure detection system (PDS) signal processing module 20, a supplemental sensor interface 22, failure simulation electronics 24, a communication bus interface 26, a user interface 28, a wireless communications interface 30, and one or more supplemental sensors 32. These parts and/or devices of the failure detection module 16 can be included into a dedicated electronic module that is included in the system 10 for purposes of identifying failures of the SUM 12 and/or the method discussed herein. In other embodiments, the FDM 16 can be incorporated into one or more already existing portions or devices such as through configuring the one or more pre-existing individual components (e.g., components of the SUM 1.2 or another component separate from the SUM 12) so that these individual components carry out the method discussed herein. And, in yet another embodiment, various parts of the FDM 16 can be incorporated into a dedicated module and others can be incorporated (or configured) into other, pre-existing components of the system 10. Moreover, it should be appreciated that the dedicated module can be a single module or, in other embodiments, the FDM 16 can be incorporated into multiple dedicated modules.

The failure simulation electronics 24 can be used during development and testing of the failure detection system 10 and/or the failure detection module 16. The failure simulation electronics 24 provides a mechanism for assessing the FDS performance during the design and development phase. The failure simulation electronics 24 is not a part of the final FDS 10 when the FDS 10 (or the system into which the FDS 10 is incorporated) is in use by a consumer—that is, for example, when the IDS is used in the context of a vehicle system, the failure simulation electronics 24 would not be a part of the production vehicle. The failure simulation electronics 24 permits failures in components, including key components, to be simulated electronically and permits the performance of the FDS for detecting and/or identifying failures/errors to be measured and/or otherwise evaluated.

FIG. 1 depicts a separate and direct communication link 40 between the FDM 16 and an electronic system, namely the SUM 12. The direct communication link 40 is shown as being connected to the SUM 12 and the failure simulation electronics 24, which can be the case when the FDS 10 and/or FDM 16 is being developed and/or tested. However, as mentioned above, systems in production for use by an end consumer or user do not include the failure simulation electronics 24, at least in many embodiments. Thus, in such instances, the FDS 10 can include the direct communication link 40 between the SUM 12 and another part (or device) of the RIM 16, such as the failure FDS signal processing module 20.

As mentioned, the SLAM 12 can include one or more individual components and, in some embodiments, can represent either a single component or a single subsystem. This direct connection 40 is depicted by a dashed line since it is not a communication link that normally would be included in the electronic system, unlike the communication bus typically would be, for example. In other embodiments, the FDM 16 and the SUM 12 can be connected via the communications bus 18 (or other communication link); however, a direct connection can be added (as shown by the dashed line) since, in some scenarios, there may be some exceptional conditions in which it may be desirable to avoid the latency of the communication bus 18. For example, for certain safety related failures, the message identifying the failure or error could conceivably be greatly improved through using this direct connection 40 by enabling the system to instantaneously (or, near-instantaneously) send the warning message concerning a component failure. In addition, in at least some embodiments, the direct connection 40 can simplify synchronization of sensor sampling between the supplemental sensors 32 and the existing system sensors, including the SUM sensors 13 and the other system sensors 14. Moreover, in some embodiments, the estimated error can restore system performance; an example of this is a calibration failure in a lidar/radar sensor or other surveillance sensors; such a failure in the sensor (when it is used for vehicle steering) can lead to possible accidents in some scenarios.

The wireless communications module 30 can be used to communicate data via short-range wireless communications (SRWC) and/or via cellular network communications through use of wireless communication circuitry (WCC). In one embodiment, the wireless communications module 30 includes WCC, an antenna, and a GNSS receiver, which includes a GNSS antenna; although in the depicted embodiment of FIG. 2, the GNSS receiver 114 is part of a module separate from the wireless communications module 30. In one embodiment, the wireless communications module 30 may be a standalone module or, in other embodiments, the wireless communications module 30 may be incorporated or included as a part of one or mole other vehicle system modules, such as a center stack module (CSM), body control module (KM) an infotainment module, a head unit, the failure detection module 16, and/or a gateway module. In some embodiments, the wireless communications module 30 can be implemented as an OEM-installed (embedded) or aftermarket device that is installed in the vehicle. And in at least one embodiment, the wireless communications module 30 is a telematics unit (or telematics control unit) that is capable of carrying out cellular communications using one or more cellular carrier systems (not shown). For example, the wireless communications module 30, in essence, can constitute a vehicle to infrastructure (V2I) communication system.

In some embodiments, the wireless communications module 30 can be configured to communicate wirelessly using one or more short-range wireless communications (SRWC) protocols, such as any of the Wi-Fi™, Wi-Fi Direct™, other IEEE 802.11 protocols, ZigBee™, Bluetooth™ (including any of the Bluetooth™ protocols, such as Bluetooth™ Low Energy), or near field communication (NFC). In such an embodiment, the WCC can be a short-range wireless communication (SRWC) circuit that enables the wireless communications module 30 to transmit and receive SRWC signals, such as Bluetooth signals. The SRWC circuit may allow the module 30 to connect to another SRWC device. Additionally, in some embodiments, the wireless communications module 30 may contain a cellular chipset that may be a part of the WCC also, or that may be separate WCC (or cellular chipset). Thus, in such embodiments, the wireless communications module enables the vehicle 100 to communicate via one or more cellular protocols, such as those used by various cellular carrier systems.

Wireless communications module 30 may enable vehicle 100 to be in communication with one or more remote networks via TCP/IP or other packet-switched data communication. Packet-switched data communications may also be carried out via use of a cellular network that may be accessible by the wireless communications module 30. The wireless communications module 30 may, via the WCC, communicate data over various wireless carrier systems, including cellular carrier networks. In such an embodiment, radio transmissions may be used to establish a communications channel, such as a voice channel and/or a data channel, with a wireless carrier system so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

The user interface 28 can include various device-user interfaces that are capable of communicating information between the vehicle electronics and a user or operator of the vehicle. Non-limiting examples can include a display, an audio speaker, a visual display, a computer monitor, a television, a tactile actuator or other tactile/haptic mechanism, lights (e.g., LEDs), and/or various other device-user interfaces. Any of these device-user interfaces can be used to provide the notification or warnings discussed herein. In addition, the user interface can be designed to have user inputs to the system using standard touch screen technology.

Figure 2:
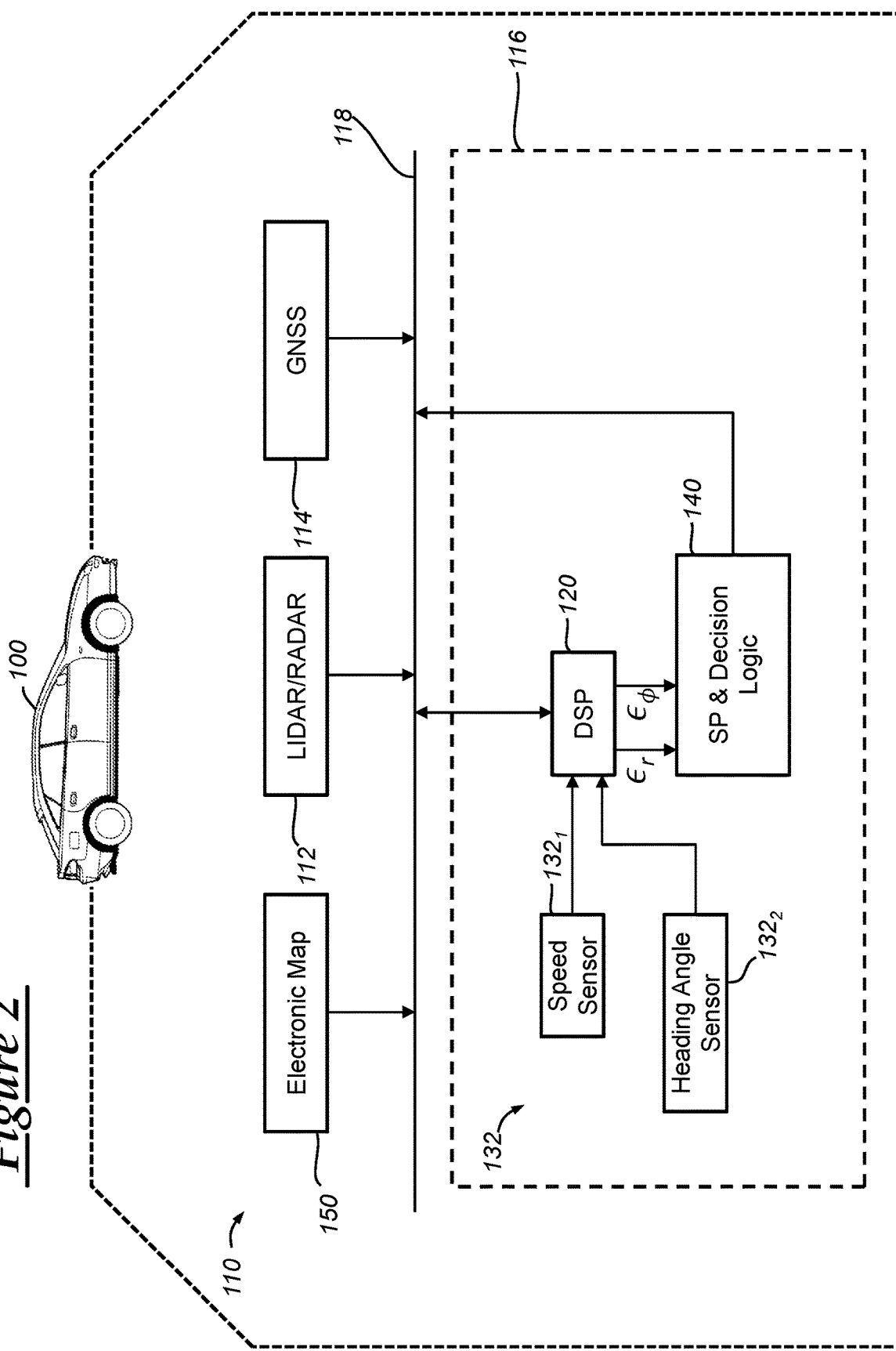
FIG. 2 is a block diagram of an embodiment of a failure detection system for lidar/radar as incorporated into vehicle electronics of a vehicle.

With reference to FIG. 2, there is shown an embodiment of the FDS for lidar and/or radar (FDSLR) 110 that is installed in a vehicle 100. The vehicle 100 is depicted as a passenger car, but it should be appreciated that any other vehicle including motorcycles, trucks, sports utility vehicles (SUVs), recreational vehicles (RVs), bicycles, other vehicles or mobility devices that can be used on a roadway or sidewalk, etc., can also be used. The vehicle 100 can include those components discussed above with respect to the FDS 10, and some of those particular components are represented in FIG. 2, as discussed below.

The FDSLR 110 includes a lidar and/or radar (lidar/radar) unit 112, which corresponds to the SUM 12 (FIG. 1). The FDSLR 110 also includes a GNSS receiver 114, which corresponds to the other system sensors 14 (FIG. 1), an electronic map 150, and a FDMLR (FDM for lidar and/or radar) 116, which corresponds to FDM 16 (FIG. 1). The FDMLR 116 includes a digital signal processor 120 that corresponds to the FDS signal processing 20 (FIG. 1), a speed sensor $132_1$ that corresponds to a first supplemental sensor $32_1$ (FIG. 1), a heading angle sensor $132_2$ that corresponds to a second supplemental sensor $32_2$ (FIG. 1), and SP & Decision Logic 140.

The failure detection module (FDM) 116 is analogous to that of the failure detection module (FDM) 16 (FIG. 1) discussed above. However, the FDM 116 does not include failure simulation electronics (such as those failure simulation electronics 24 of the FDM 16) and, thus, the FDM 116 represents the FDS 110 and FDM 116 as incorporated into a production vehicle. The failure detection module 116 can include a digital signal processor (DSP) 120 and memory. The DSP 120 can be any of a variety of devices capable of processing electronic instructions, including microprocessors, microcontrollers, host processors, vehicle communication processors, and application specific integrated circuits (ASICs). The DSP 120 can be a dedicated processor used only for the failure detection module 116, or may be shared with other systems and/or may be implemented using existing on-board vehicle digital computational system. The DSP 120 can execute various types of digitally-stored instructions, such as software or firmware. The memory can be any of a variety of electronic memory devices that can store computer instructions and/or other electronic information, such as a powered temporary memory, or any suitable non-transitory, computer-readable medium. Such examples can include different types of RAM (random-access memory, including various types of dynamic RAM (DRAM) and static RAM (SRAM)), ROM (read-only memory), solid-state drives (SSTs) (including other solid-state storage such as solid state hybrid drives (SSHDs)), hard disk drives (HDDs), and magnetic or optical disc drives. In some embodiments, the failure detection module can be implemented as an OEM-installed (embedded) or aftermarket device that is installed in the vehicle.

The lidar/radar unit 112 is part of the electronics of the vehicle and can include a lidar or radar emitter and a lidar or radar receiver. In one embodiment the lidar/radar unit 112 is a lidar unit that can emit non visible light waves for purposes of detecting spatial information of an area surrounding the vehicle 100. And, in some embodiments, the lidar/radar unit 112 emits a plurality of light pulses (e.g., laser light pulses) and receives the reflected light pulses using a lidar receiver. In another embodiment, the lidar/radar unit 112 is a radar unit that transmits radar signals for purposes of detecting spatial information of an area surrounding the vehicle 100, and, in at least one embodiment, the lidar/radar unit 112 emits a plurality of radar signals (e.g., radar pulses) and receives the reflected radar pulses using a radar receiver. And, in some embodiments, the lidar/radar unit 112 can include both a radar unit and a lidar unit, and/or multiple radar units and/or multiple lidar units. The lidar/radar unit 112 can be mounted (or installed) on the front, the side, and/or the rear of the vehicle 100. Both the radar unit and the lidar unit are considered environment sensors as each detects information concerning an area surrounding the vehicle 100.

The GNSS receiver 114 includes an antenna that enables the receiver 114 to receive GNSS radio signals from GNSS satellites (not shown). GNSS receiver 114 may be any suitable commercially available GNSS receiver and may receive GNSS information, which may then be sent over the IVN 18 to other vehicle modules. Although the GNSS receiver 114 is shown as being separate from the FDMLR 116, in other embodiments, the GNSS receiver 114 can be included as a part of the FDMLR 116, such as one of the plurality of supplemental sensors 132.

Speed sensor $132_1$ is an onboard vehicle sensor that is installed as a part of the vehicle electronics. The speed sensor $132_1$ determines a speed of the vehicle (e.g., vehicle speed $u_0$) and, in many embodiments, the speed sensor $132_1$ can be said to be an accurate vehicle vector sensor. As used herein, an accurate vehicle vector sensor is an onboard vehicle sensor that accurately determines a vector component of the vehicle. And, as used herein, the term "accurate" (including its various forms) when used in conjunction to describe sensors or sensor readings, refers to sensors or readings/measurements that are considered to be reliable for determining error(s) in environment sensors (e.g., the lidar/radar unit 112), such as that as discussed in the embodiments of the method(s) below. The speed sensor $132_1$ is an onboard vehicle sensor and, as used herein, an onboard vehicle sensor is a vehicle sensor that is installed as a part of the vehicle electronics and that determines or detects information concerning the operation of the vehicle, including vehicle speed and heading. In one embodiment, the speed sensor $132_1$ is a wheel speed sensor, a vehicle speed sensor (VSS), a radar speed sensor that can provide accurate speed reading/measurements for the vehicle, or other sensor that can provide a vehicle speed reading (or an accurate vehicle speed reading). In many embodiments, the radar speed sensor is separate from the lidar/radar unit under monitoring.

Heading angle sensor $132_2$ is an onboard vehicle sensor that is installed as a part of the vehicle electronics. The heading angle sensor $132_2$ determines a heading angle of the vehicle, such as the heading angle $\alpha_0$ as discussed below. In many embodiments, the heading angle sensor $132_2$ can be said to be an accurate vehicle vector sensor. In one embodiment, the heading angle sensor $132_2$ can use the current vehicle location (as determined using the GNSS receiver 114) and various other vehicle sensors (e.g., accelerometers) to determine the heading angle $\alpha_0$. In another embodiment, the heading angle sensor $132_2$ can be (or use) a digital compass. In other embodiments, the vehicle 100 can include a speed sensor and a heading angle sensor that are other system sensors 14 instead of being supplemental sensors 32. The electronic map 150 can be geographical map data that includes geographical information pertaining to one or more roadways and/or traffic signals (or other traffic-related objects) of an area surrounding the vehicle 100. The electronic map 150 can be stored in the memory of the wireless communications module 30, or as a pan of memory of another vehicle module, as shown in FIG. 2.

Figure 3:
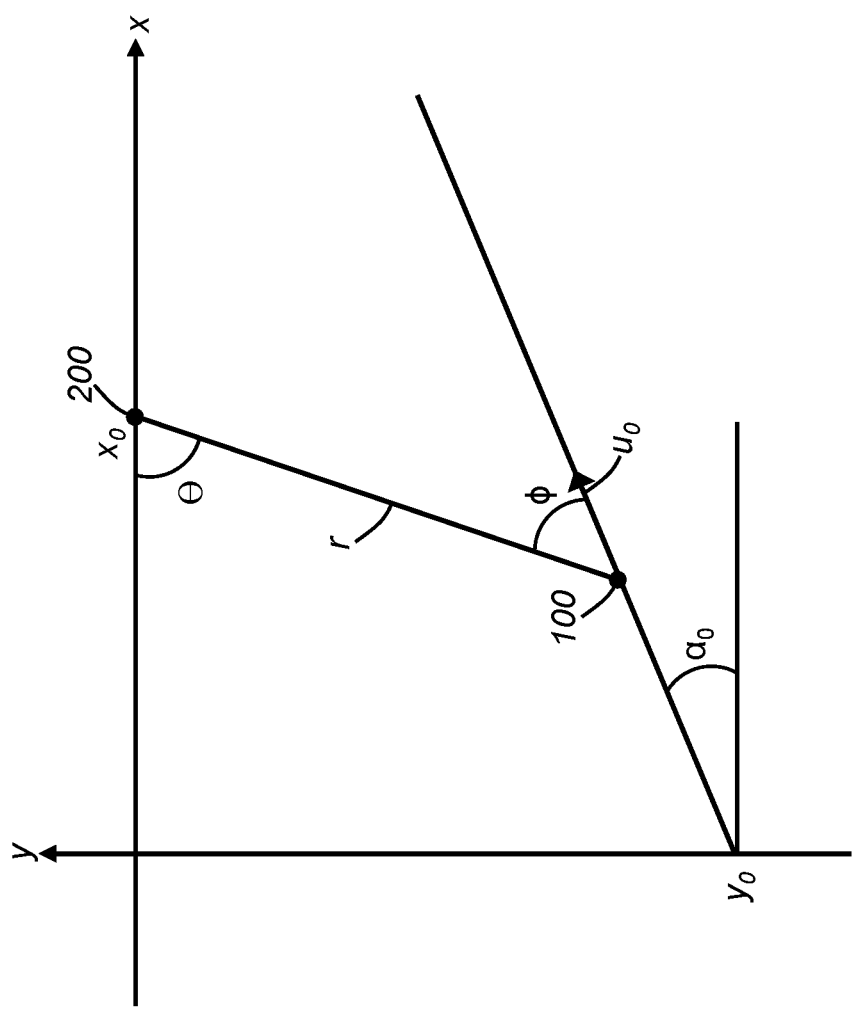
FIG. 3 depicts a graph of a vehicle in relation to an external object.

The FDS for ruler or radar surveillance systems (FDSLR) (e.g., FDSLR 110) is based on independent computation and measurement of the vehicle velocity vector. The exemplary vehicle system involves the vehicle moving in a plane that is tangent to the earth and whose instantaneous location in this Earth Fixed (EF) coordinate system is given by coordinates x and y as depicted in FIG. 3. In the depicted scenario, coordinate $0,y_0$ is the scatting position of the vehicle 100. The exemplary vehicle 100 that has the electronic systems depicted in FIG. 2 is moving at a speed $u_0$ with a heading angle $\alpha_0$ relative to the x-coordinate direction as depicted in the FIG. 3. FIG. 3 also depicts a localized fixed object 200 at coordinate $x_0,0$ in the EF coordinate system. The position of a fixed object is available to the FDSLR from data in the on-board electronic maps 150 as shown in FIG. 2. For example, the vehicle can use geographic map data to determine a position of the localized fixed object 200. As an example, the fixed object 200 can be a traffic light, a building, a traffic sign, or some other fixed object. And, although the method below is discussed with respect to a fixed object 200, in other embodiments a moveable object can be used in place of the fixed object 200, assuming that an accurate velocity vector of the moveable object is known to (or obtainable by) the vehicle 100 (or the FDMLR 116).

The actual range (i.e., straight line distance) to the fixed object from the vehicle instantaneous position is denoted r in FIG. 3. The angle of a line from the vehicle to the fixed object relative to the vehicle longitudinal axis is denoted $\phi$ in FIG. 3. This angle $\phi$ is the angle between the heading of the vehicle 10 and the localized fixed object 200, and can be referred to as the azimuth angle $\phi$. The angles to the left of the longitudinal vehicle axis (i.e., along which the heading is measured) can be considered negative and those angles to the right of the longitudinal vehicle axis can be considered positive.

The model for vehicle position relative to r, $\phi$, and $a_0$ is given by:

$$(a) x = x_0 - r\cos(\theta)$$

$$(b) y = r\sin(\theta)$$

$$(c) r = [(x_0-x)^2 + y^2]^{1/2}$$

(d) $\tan(\theta) = y/(x_0 - x)$ (e) $\theta = (\phi - \alpha_0)$ (Equation 1)

where x is the location of the vehicle 100 along the x-coordinate, y is the location of the vehicle 100 along the y-coordinate, $x_0$ is the location of the fixed object 200 along the x-coordinate, r is the range (or linear distance) between the vehicle 100 and the fixed object 200, $a_0$ is the heading angle of the vehicle 100 relative to the x-coordinate, $\phi$ is the azimuth angle (or vehicle-object angle), and $\theta$ is the angle between the x-coordinate and the fixed object 200 as taken at the location of the vehicle 100 (x,y), and can be referred to as the fixed object angle $\theta$.

The vehicle true velocity vector in relationship to the earth fixed (EF) coordinate system is denoted S and is given by or determined using the fallowing:

(Equation 2)

$S = [S_x, S_y]^T$ (a)

$S_x = \dot{x} = -\dot{r}\cos(\phi - \alpha_0) + r\dot{\phi}\sin(\phi - \alpha_0)$ (b)

$S_y = \dot{y} = \dot{r}\sin(\phi - \alpha_0) + r\dot{\phi}\cos(\phi - \alpha_0)$ (c)

$A_s = \begin{bmatrix} -\cos(\theta) & \dot{\phi}\sin(\theta) \\ \sin(\theta) & \dot{\phi}\cos(\theta) \end{bmatrix}$ (d)

$R = \begin{bmatrix} \dot{r} \\ r \end{bmatrix}$ (e)

$S = A_s R$ (f)

where $S_x$ is the x component of the vehicle true velocity vector S, $S_y$ is they component of the vehicle true velocity vector S. The Equation 2(d) through 2(f) represent the vehicle true velocity vector S in matrix equation form. In at least some embodiments, the vehicle true velocity vector S represents the actual (or accurate) vehicle velocity vector as determined through using sensors 132.

In some embodiments, computations are performed with a digital electronic system (e.g., special purpose computer), such as the DSP 120. Such computations for a dynamic system can be performed on discrete time samples of any continuous time variable. It can be assumed that sampling is periodic with sample period denoted $T_S$ in which the k-th sample time is denoted $t_k = kT_S$, where each k is an integer. The discrete time velocity vector at sample time $t_k$ is denoted S(k). The discrete time model for S(k) for the actual position of the vehicle 100 at sample time $t_k$ is denoted by $x_k$, $y_k$ and is provided by the following:

(a) $S(k) = [S_x(k), S_y(k)]^T$ (b) $S_x(k) = -\dot{r}_k \cos(\phi_k - \alpha_0) + r_k \dot{\phi}_k \sin(\phi_k - \alpha_0)$ (c) $S_y(k) = \dot{r}_k \sin(\phi_k - \alpha_0) + r_k \dot{\phi}_k \cos(\phi_k - \alpha_0)$ Where a sampled estimate at a specific sample time $t(k_1) = k/T_S$ is given by:

(Equation 3)

$\dot{r}_1 = 0.5\left[\dfrac{r(k_1+1) - r(k_1)}{T_s} + \dfrac{(r(k_1) - r(k_1-1))}{T_s}\right]$ (d)

$\dot{\phi}_1 = 0.5\left[\dfrac{\phi(k_1+1) - \phi(k_1)}{T_s} + \dfrac{\phi(k_1) - \phi(k_1-1)}{T_s}\right]$ (e)

$x_k = kT_s u_0 \cos(\alpha_0), \ y_k = y_0 + kT_s u_0 \sin(\alpha_0)$ (f)

where $r_i = r(k_i)$ and $\phi_i = \phi(k_i)$ (e.g., $r_1 = r(k_1)$ and $\phi_1 = \phi(k_1)$).

After the actual (or accurately-estimated) position of the vehicle is modelled using the vehicle modelling methodology provided above, a lidar/radar failure detection process can be carried out. Below there is provided an exemplary model for errors in the lidar/radar and for the failure detection algorithms that are used to calculate these errors. This failure detection is based on measurements of range $r_m$ and azimuth angle $\phi_m$ made by the lidar/radar system with the notation $r_m(k)$ denoting the measured range r at sample time $t_k$ and $\phi_m(k)$ denoting the measured value oldie azimuth angle $\phi$ at $t_k$. For convenience, $r_m = (1 + \in_r)r(k_1)$, $\phi_m = \phi(k_1) + \in_\phi$, where $\in_r$ is the range error and $\in_\phi$ is the azimuth error.

The sample of vehicle velocity that is calculated from these lidar/radar measurements ($r_m$ and $\phi_m$) at time $t_k$ for a specific $k_1$ is defined by:

(Equation 4)

$S_m = \begin{bmatrix} S_{xm} \\ S_{ym} \end{bmatrix}$ (a)

$S_{xm} = -\dot{r}_m \cos(\phi_m - \alpha_0) + r_m \dot{\phi}_m \sin(\phi_m - \alpha_0)$ (b)

$S_{ym} = \dot{r}_m \sin(\phi_m - \alpha_0) + r_m \dot{\phi}_m \cos(\phi_m - \alpha_0)$ (c)

where $S_m$ is the measured vehicle velocity vector, $S_{xm}$ is x-component of the measured vehicle velocity vector $S_m$, and $S_{ym}$ is y-component of the measured vehicle velocity vector $S_m$. The measured vehicle velocity vector $S_m$ can be derived based on the measured range $r_m$ and the measured azimuth angle $\phi_m$. The measured range $r_m$ and the measured azimuth angle $\phi_m$ are measured using the lidar/radar unit 112. In many embodiments, it can be determined that there is an error in the lidar/radar unit 112 when it is determined that $S_m \neq S(k_1)$. The measured vehicle velocity vector $S_m$ is based on calculations from the lidar/radar measurement and can be written in matrix form.

Once a lidar/radar error is detected (or it is determined that a lidar/error is present), then the source of the error can be determined—for example, whether the lidar/radar error is a range error and/or an azimuth error. The example below presents two independent error sources, (I) azimuth angle, and (II) range:

(I) $\phi_{1m} = \phi_m(k_1) = \phi(k_1) + \in_\phi$, assuming that $\in_r = 0$ (II) $r_{1m} = r_m(k_1) = (1 + \in_r)r(k_1)$, assuming that $\in_\phi = 0$ (Equation 5)

where $\in_r$ is the tidal-Nadu range error and $\in_\phi$ is the lidar/radar azimuth error. In other in embodiments, other sources of error (e.g., elevation error) can be detected using similar methods as is apparent to one skilled in the art from the discussion below.

For the azimuth error, it can be assumed that the range error $\in_r$ is zero, as shown above in Equation 5(I). In this sense, the hypothesis used below assumes that there is an error in the $\phi_1$ measurement-based calculations:

(Equation 6)

(a) $S_{1m}(k) = X_{1m}A_{1m}$, where:

(b) $A_{1m} = [\cos(\phi_{1m} - \alpha_0), \sin(\phi_{1m} - \alpha_0)]^T$ (c) $X_{1m} = \begin{bmatrix} -\dot{r}_{1m} & r_{1m}\dot{\phi}_{1m} \\ r_{1m}\dot{\phi}_{1m} & \dot{r}_{1m} \end{bmatrix}$ That is, $S_{1m}(k)$ is the estimated first component monitored sensor velocity vector based on the assumption that there is only an error in the azimuth angle. In at least one embodiment, $A_{1m}$ can be referred to as a first component estimate matrix. This first component monitored sensor velocity vector is a monitored sensor velocity vector that is determined based on measurements from the lidar/radar unit (or other monitored sensor) and that assumes there only exists an error in the first component (e.g., azimuth angle). In many embodiments, if there was no error in $\phi$ or r measurements, the product given in Equation 6(a) would yield the exact value of the velocity $S(k_1)$.

As in the case of the application of the FDS system as depicted in FIG. 1 supplemental sensors are a part of the FDS. In the present exemplary vehicle, lidar/radar application of the FDS (the "FDSLR"), the sensors include accurate vehicle speed ($u_0$) sensor $132_1$ and heading angle ($\alpha_0$) sensor $132_2$. With such sensors, the correct vehicle speed S is given by:

$S=[S_x,S_y]^T$ where $S_x=u_0\cos(\alpha_0)$ $S_y=u_0\sin(\alpha_0)$ (Equation 7)

The estimate of a matrix $A(k_1)$ yields matrix coefficients from which an estimate of the correct (i.e., error free) azimuth angle $\phi_1$ is obtained using the following equations:

(a) $\hat{A}(k_1)=X_{1m}^{-1}S(k_1)$ (b) $\hat{A}(k_1)=[\cos(\hat{\phi}(k_1)-\alpha_0), \sin(\hat{\phi}(k_1)-\alpha_0)]^T$ (c) $\hat{\phi}(k_1)=\sin^{-1}(\hat{A}\{2\})+\alpha_0$ (Equation 8)

where $\hat{A}(k_1)$ is an estimate of the correct or highly-accurate matrix $A(k_1)$ and $\hat{\phi}(k_1)$ is the corrected azimuth angle, which can be considered a (highly) accurate estimate of the azimuth angle (at least in some embodiments). As used herein, $A\{n\}$ is the n-th element of the matrix A and, for example, $\hat{A}\{2\}=\sin(\hat{\phi}(k_1)-\alpha_0)$ as used in Equation 8. In some embodiments, the corrected azimuth angle (denoted $\hat{\phi}(k_1)$) is an estimate of the angle $\phi(k_1)$ based on lidar/radar measurements, vehicle speed $u_0$, and/or heading angle $\alpha_0$, and is derived using Equation 8. This corrected azimuth angle is an estimate of the azimuth angle assuming that the error in the lidar/radar unit 112 is only due to error(s) in the azimuth angle measurements (i.e., not in errors in other components of the monitored sensor velocity vector). The monitored sensor velocity vector is the vehicle velocity vector as determined using the SUM 12 (e.g., the lidar/radar unit 112). As mentioned above, the vehicle speed $u_0$ can be measured using the vehicle speed sensor $132_1$ and the heading angle $\alpha_0$ can be measured using the heading sensor $132_2$. The calculations of Equation 8 yield an accurate estimate of azimuth angle $\phi(k_1)$ (or corrected azimuth angle $\hat{\phi}(k_1)$) assuming that the error in the monitored sensor velocity vector is only with respect to the azimuth angle (e.g., with the accuracy determined by the accuracy of the sensors and the assumption that $\in_r=0$). The implementation of accurate speed sensors and heading sensors can be used to yield a (highly) accurate estimate of the azimuth angle $\phi(k_1)$ (i.e., corrected azimuth angle $\hat{\phi}(k_1)$). The estimate of the azimuth angle error $\hat{\in}_\phi$ to can now be given by $\hat{\in}_\phi=\phi_m(k_1)-\hat{\phi}(k_1)$.

In some embodiments, the hypothesis that the lidar/radar error is limited only to the azimuth angle $\phi$ (hypothesis (I)) can be confirmed to assure or better predict that there is no error in the range measurement cement $r_m$. In one embodiment, this confirmation or verification can be performed using the following equations:

(a) $\theta_T=\hat{\phi}(k_1)+\in_\phi-\alpha_0$ (b) $A_{1T}=[\cos(\theta_T), \sin(\theta_T)]^T$ (c) $S_{1T}=X_{1m}A_{1T}$ (Equation 9)

where $\theta_T$ is the tested fixed object angle, $A_{1T}$ is a first hypothesis verification vector, and $S_{1T}$ is the first test vehicle velocity vector. In at least one embodiment, $A_{1T}$ is used to confirm the validity of the corresponding hypothesis (e.g., hypothesis (I), hypothesis (II)). These tested values are based on the vehicle heading $\alpha_0$ as determined by the heading angle sensor $132_2$ and the estimated azimuth angle error $\hat{\in}_\phi$. This confirmation is accomplished by taking the estimated azimuth angle error $\hat{\in}_\phi$ and using it with a matrix equation, as shown in Equation 9 (note, that this is analogous to that of Equation 6). When it is determined that $S_{1T}=S_{1m}$ (or that the norm of the difference between $S_{1T}$ and $S_{1m}$ is less than a threshold amount), then it can be determined that the hypothesis (I) is confirmed.

As an illustration, a simulation was conducted with the vehicle travelling at a speed $u_0=10$ km/sec (kilometers per second) at an angle $\alpha_0=0.1745$ radians. The errors for the first simulation are $\in_r=0, \in_\phi=0.0500$. The simulation yields an estimate $\hat{\in}_\phi=0.0500$. The velocity vectors are as follows.

$S_{1m}=[9.9226,1.2417]^T$ $S_{1T}=[9.9226,1.2417]^T$

In some embodiments, the agreement between $S_{1T}$ and $S_{1m}$ are sufficient to confirm the hypothesis of an error only in the azimuth angle $\phi$ measurements. Another simulation was run with $\in_r=0.01$ in addition to the $\in_\phi$ error above of $\in_\phi=0.0500$. In this simulation, the estimated error $\hat{\in}_\phi$ and the two velocity vectors are.

$\hat{\in}_\phi=0.0389$ $S_{1m}=[10.0219,1.2541]^T$ $S_{1T}=[10.0351,1.1432]^T$

In this simulation, it can be determined that $S_{1T}\neq S_{1m}$ and, thus, since $S_{1T}\neq S_{1m}$, the hypothesis (I) is not valid and is not confirmed.

In at least one embodiment, when the hypothesis (I) is not valid, then the hypothesis (II) can be tested. The hypothesis (II) can be for determining whether there is a lidar/radar error in the range and this error can be found using a similar procedure to that given above with respect to the hypothesis (I). In this case, the speed vector obtained by calculations on lidar/radar measurements is denoted $S_{2m}$ and has components $S_{x2m}, S_{y2m}$. That is, $S_{2m}$ is the second component monitored sensor velocity vector that is determined based on the assumption that there is only an error in the range. This second component monitored sensor velocity vector is a type of a monitored sensor velocity vector that is determined based on measurements from the lidar/radar unit (or other monitored sensor) and that assumes there only exists an error in the second component (e.g., range). And, in this case, the matrix to be estimated is denoted $A_{2m}$ and is a two-dimensional vector and, in some embodiments, can be referred to as a second component estimate matrix. These variables can be given by the following:

(Equation 10)

$$S_{2m} = X_{2m} A_{2m} \quad (a)$$

$$A_{2m} = [\dot{r}_{1m}, r_{1m}]^T \quad (b)$$

$$X_{2m} = \begin{bmatrix} -\cos(\phi_{1m} - \alpha_0) & \dot{\phi}_{1m}\sin(\phi_{1m} - \alpha_0) \\ \sin(\phi_{1m} - \alpha_0) & \dot{\phi}_{1m}\cos(\phi_{1m} - \alpha_0) \end{bmatrix} \quad (c)$$

The correct values (or the estimated correct values) of the components that in correspond to those of the matrix $A_{2m}$ are obtained using the following equation:

$$\hat{A}_2 = X_{2m}^{-1} S(k_1) \quad \text{(Equation 11)}$$

where the speed vector $S(k_1)$ is the same as that of Equation 8(a) and is obtained as explained above using the supplemental speed and heading sensors $132_2$ of the FDS. The estimate of the correct (i.e., error free) range $r(k_1)$ is denoted $\hat{r}(k_1)$ and can be referred to as the corrected range $\hat{r}(k_1)$. The corrected range $\hat{r}(k_1)$ is the range that is determined assuming that there are no errors in the other vector components (e.g., the azimuth angle) and is obtained using the following equation:

$$\hat{r}(k_1) = \hat{A}_2\{2\} \quad \text{(Equation 12)}$$

And, thus, the hypothesized range error $\hat{\in}_r$ is computed using the following:

(Equation 13)

$$\hat{\in}_r = \left(\frac{r_{1m}}{\hat{r}(k_1)}\right) - 1$$

Once the hypothesized range error $\hat{\in}_r$ is computed, then the hypothesis (II) can be tested.

A test of the validity of the hypothesis (II) in the lidar/radar system error is given by:

$$(a) r_T = (1 + \hat{\in}_r)\hat{r}(k_1)$$

$$(b) \dot{r}_T = \hat{A}_2\{1\}(1 + \hat{\in}_r)$$

$$(c) A_{2T} = [\dot{r}_T, r_T]^T$$

$$(d) S_{2T} = X_{2m} A_{2T} \quad \text{(Equation 14)}$$

Using the estimated range error $\hat{\in}_r$, the two components of the range $r_T$ and time derivative (of the range) $\dot{r}_T$ are the components of the $A_{2T}$ vector, which is the second hypothesis verification vector. The second test velocity vector $S_{2T}$ is computed using Equation 14(d) and is the second test vehicle velocity vector. When it is determined that the test speed vector $S_{2T}$ is equal to the speed vector $S_{2m}$ that is computed from lidar/radar measurements, then it is (or can be) determined that the error hypothesis (II) and the range error estimate are correct. When it is determined that $S_{2T} = S_{2m}$ (or that the absolute value of the difference between $S_{2T}$ and $S_{2m}$ is less than a threshold amount), then it can be determined that the hypothesis (II) is confirmed.

The simulation described above for the demonstration of estimating $\hat{\in}_\phi$ was conducted for errors of hypothesis (II) for the same vehicle speed and heading. In this simulation, $\hat{\in}_\phi = 0$, $\in_r = 0.1000$. The estimate of $\in_r$ is $\hat{\in}_r = 0.1000$. The test and measured speed vectors are:

$$S_{2m} = [10.8330, 1.9097]^T$$

$$S_{2T} = [10.8331, 1.9098]^T$$

These two vectors are sufficiently close to confirm hypothesis (II). In at least some embodiments, the threshold for determining when $S_{2T}$ is sufficiently close to $S_{2m}$ (also for $S_{1T}$ and $S_m$) is based on the tolerances of the lidar/radar measurements for their use in the vehicle control system. For example, these tolerances are upper bound limits to the magnitudes of $\in_\phi$ and $\in_r$ for which the vehicle system using lidar/radar measurements is within acceptable performance. In at least some embodiments, the actual magnitude of these tolerances can and should be established during the design of the associated system and the determination of these values can readily be established via simulations and later confirmed in vehicle test track measurements of performance.

In one embodiment, if there are multiple vehicle systems that employ lidar/radar measurements, the tolerance limits are those that are the smallest of the set for all systems that employ lidar/radar data. For example, these tolerance limits can be readily used to compute the difference $S_{1T} - S_{1m}$ or $S_{2T} - S_{2m}$. Whenever these differences are less than the corresponding tolerance limited calculations, the associated hypothesis is confirmed. That is, the two vectors are considered to be sufficiently close.

In the event that the test velocity vectors are unequal to the measured speed vector, both $\in_\phi$ and $\in_r$ are nonzero. Thus, a technique for estimating the combined errors is based on iterations of applying both methods. The procedure for estimating the two errors is conducted as discussed below and can be referred to as a multi-component error determination process.

First, the range r and the azimuth angle $\phi$ are estimated through using Equations 8 and 12 above at times $k_1+1$ and $k_1-1$. That is, a range estimate and an azimuth angle estimate for each $k_1+1$ and $k_1-1$ can be determined using the Equations 8 and 12. Then, once these estimates $\hat{r}_{k+1}$, $\hat{r}_{k-1}$, $\hat{\phi}_{k+1}$, and $\hat{\phi}_{k-1}$, are determined, the derivative range estimate $\dot{r}$ and the derivate azimuth estimate $\dot{\phi}$ are determined using Equations 3(d) and 3(e). Then, the derivative range estimate $\dot{r}$ and the derivate azimuth estimate $\dot{\phi}$ can be used to create a new matrix $X_{1m}$ using Equation 6(c).

Next, using Equation 8, a new estimate of $\phi(k_1)$ and $\dot{\phi}(k_1)$ is determined using this new matrix $X_{1m}$. Then, a new matrix $X_{2m}$ is determined using Equation 10, but where $\phi(k_1)$ is used in place of $\phi_m$ and where $\dot{\phi}(k_1)$ is used in place of $\dot{\phi}_m$. Then, a new estimate of $r(k_1)$ and $\dot{r}(k_1)$ can be calculated using Equations 11 and 12. Once these estimates are obtained, then these estimations can be tested to determine whether they represent accurately estimated error values.

An estimate of the velocity vector $S_m(k_1)$ is obtained using the estimated values that were determined above: $\phi(k_1)$, $\dot{\phi}(k_1)$, $r(k_1)$, and $\dot{r}(k_1)$. Then, the difference between the estimated velocity vector $S_m(k_1)$ and the correct velocity vector $S(k_1)$ (derived from Equation 7) can be obtained using $S(k_1) - S_m(k_1) = e_S$. Once the velocity vector error $e_S$ is calculated, then this value can be compared with a vector velocity tolerance limit $e_{1L}$. The steps above can be repeated continuously until $e_S < e_{1L}$. In other embodiments, the steps above can be repeated continuously until $e_S \le e_{1L}$. Once this stopping condition is met, then the latest calculations of the estimates for $r_1$ and $\phi_1$ are now considered to be sufficiently accurate estimates of the correct $r_1$ and $\phi_1$. These sufficiently accurate estimates can be termed $\hat{r}_{1L}$ for the sufficiently accurate range estimate and $\hat{\phi}_{1L}$ for the sufficiently accurate heading angle estimate. The error estimates can now be obtained using the following equation:

$$\hat{\in}_\phi = \hat{\phi}_{1L} - \phi_1 \quad \hat{\in}_r = \hat{r}_{1L} - r_1 \qquad \text{(Equation 15)}$$

Once these sufficiently accurate range and heading angle estimates are obtained, then they can be provided to one or more vehicle system modules (VSMs).

Figure 4:
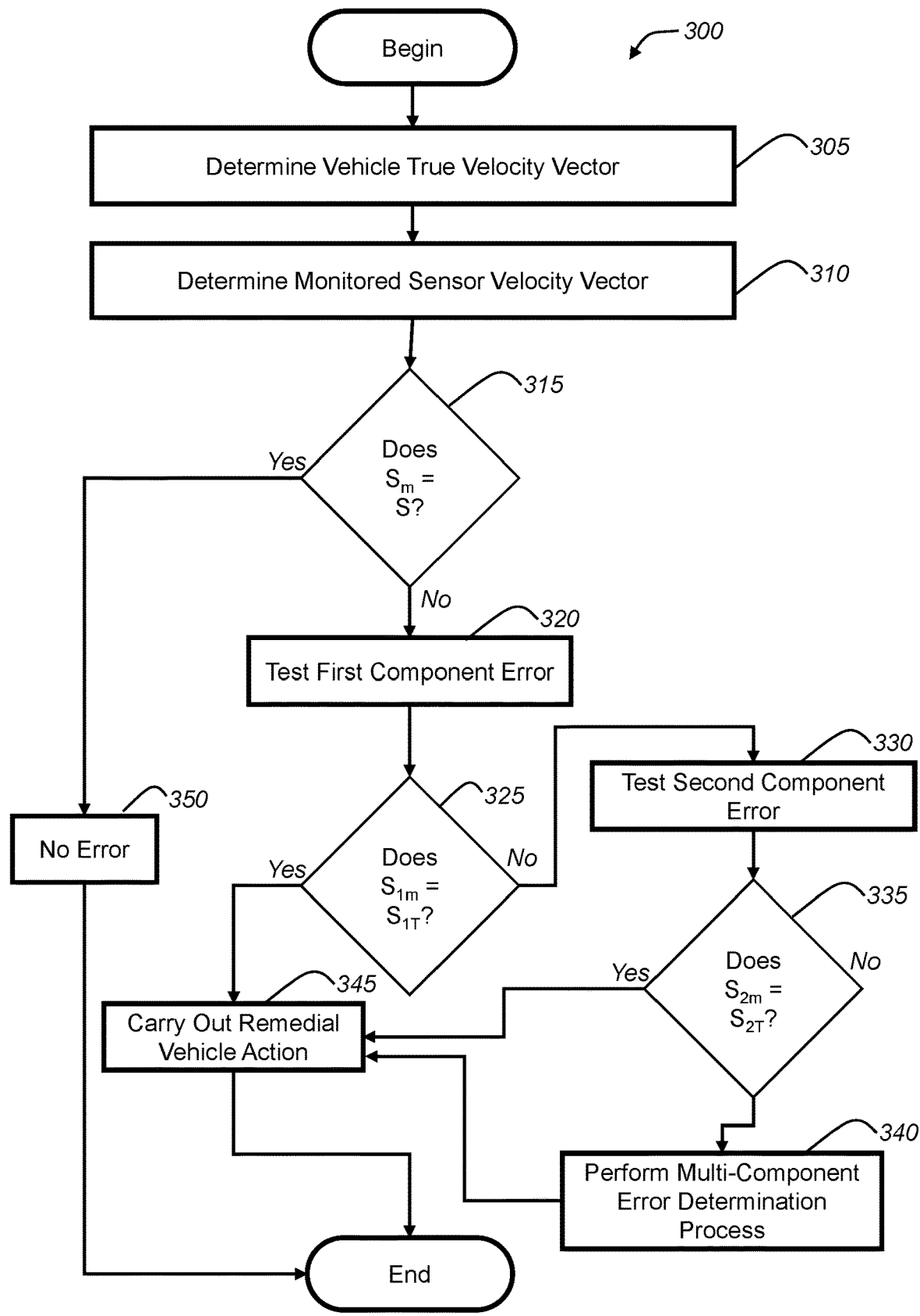
FIG. 4 is a flowchart of an embodiment of a method of carrying out a remedial vehicle action in response to determining an error in a monitored vehicle sensor.

With respect to FIG. 4, there is shown a method 300 of carrying out a remedial vehicle action in response to determining an error in a monitored vehicle sensor. The monitored vehicle sensor can be a vehicle environment sensor, such as a lidar unit (or sensor) or a radar unit for sensor). As mentioned above, the vehicle 100 (FIG. 3) can be said to have a vehicle velocity vector with respect to an external object (e.g., fixed object 200) that includes a range r and an azimuth angle $\phi$. The method 300 can be carried out by the vehicle FDSLR 110 and, in some embodiments, the method 300 is carried out by the FDMLR 116. Although the method 300 is described as being carried out in a particular order, it is hereby contemplated that the steps of the method 300 can be carried out in any technically feasible order, the same is true with respect to method 400 (FIG. 5), method 500 (FIG. 6), and method 600 (FIG. 7).

The method 300 begins with step 305, wherein a vehicle true velocity vector is determined. The vehicle true velocity vector is a velocity vector of the vehicle that is determined through use of onboard vehicle sensors and, in many cases, these onboard vehicle sensors are separate from the monitored vehicle sensor. In many embodiments, the vehicle speed sensor $132_1$ and the vehicle heading angle sensor $132_2$ can be used to determine the vehicle true velocity vector. This vehicle true velocity vector can be considered an accurate (or a highly accurate) determination of the actual vehicle velocity vector with respect to an external object, such as the fixed object 200 (FIG. 3). In one embodiment, the vehicle true velocity vector can correspond to S(k) (or S) of Equation 2 and the vehicle true velocity vector can include a time derivative of the x-coordinate (or component) and a time derivative of the y-coordinate (or component) (see Equation 2). Also, this vehicle true velocity vector can include an azimuth angle $\phi$ and a range corresponding to an external (i.e., non-vehicle) object (e.g., fixed object 200) and that is determined using onboard vehicle sensors other than the monitored vehicle sensor, such as the vehicle speed sensor $132_1$ and the vehicle heading angle sensor $132_2$. Once the vehicle true velocity vector is determined, the method 300 continues to step 310.

In step 310, a monitored sensor velocity vector is determined. This monitored sensor in velocity vector is derived using SUM measurements (e.g., range measurement $r_m$ and azimuth angle measurement $\phi_m$ from the lidar/radar unit 112). In many embodiments, the monitored sensor velocity vector is based on sensor values from environment sensors, such as a lidar unit and/or a radar unit of the lidar/radar unit 112. In one embodiment, the monitored sensor velocity vector can corresponds to $S_m$ as used above, such as in Equation 4. The method 300 continues to step 315.

In step 315, it is determined whether the monitored sensor velocity vector is different from the vehicle true velocity vector. In one embodiment, it is determined that the monitored sensor velocity vector is different from the vehicle true velocity vector when a difference between at least one corresponding component of the respective vectors is not within a particular tolerance value. For example, when it is determined that $S_x - S_{xm} >$ a threshold time derivative x component value, then it can be determined that the monitored sensor velocity vector is different from the vehicle true velocity vector. As another example, when it is determined that $S_y - S_{ym} >$ a threshold time derivative y component value, then it can be determined that the monitored sensor velocity vector is different from the vehicle 23 true velocity vector. The method 300 continues to step 320 when it is when it is determined that the monitored sensor velocity vector is different from the vehicle true velocity vector; otherwise, the method continues to step 350. In step 350, it is determined that there is no error (or the error is not above a threshold value) and, thus, the method 300 ends.

In step 320, a first component error is tested. The first vector component error refers to an error (or a potential error) in a first one of the vector components of the vehicle velocity vector. In the illustrated example of FIG. 3, the vehicle velocity vector, which is taken with respect to the fixed object 200, can be said to include an azimuth angle $\phi$ (as a first vector component) and a range r (as a second vector component). As mentioned above, in other embodiments, an elevation angle can be considered and used in other embodiments in addition to (or in place on the azimuth angle and/or range components. Those skilled in the art will appreciate how the above discussion can be applied to calculating errors in the elevation angle as observed by the lidar/radar unit 112 (or other SUM 12). The testing of the first component is described in FIG. 5 and is referred to as a method 400.

Figure 5:
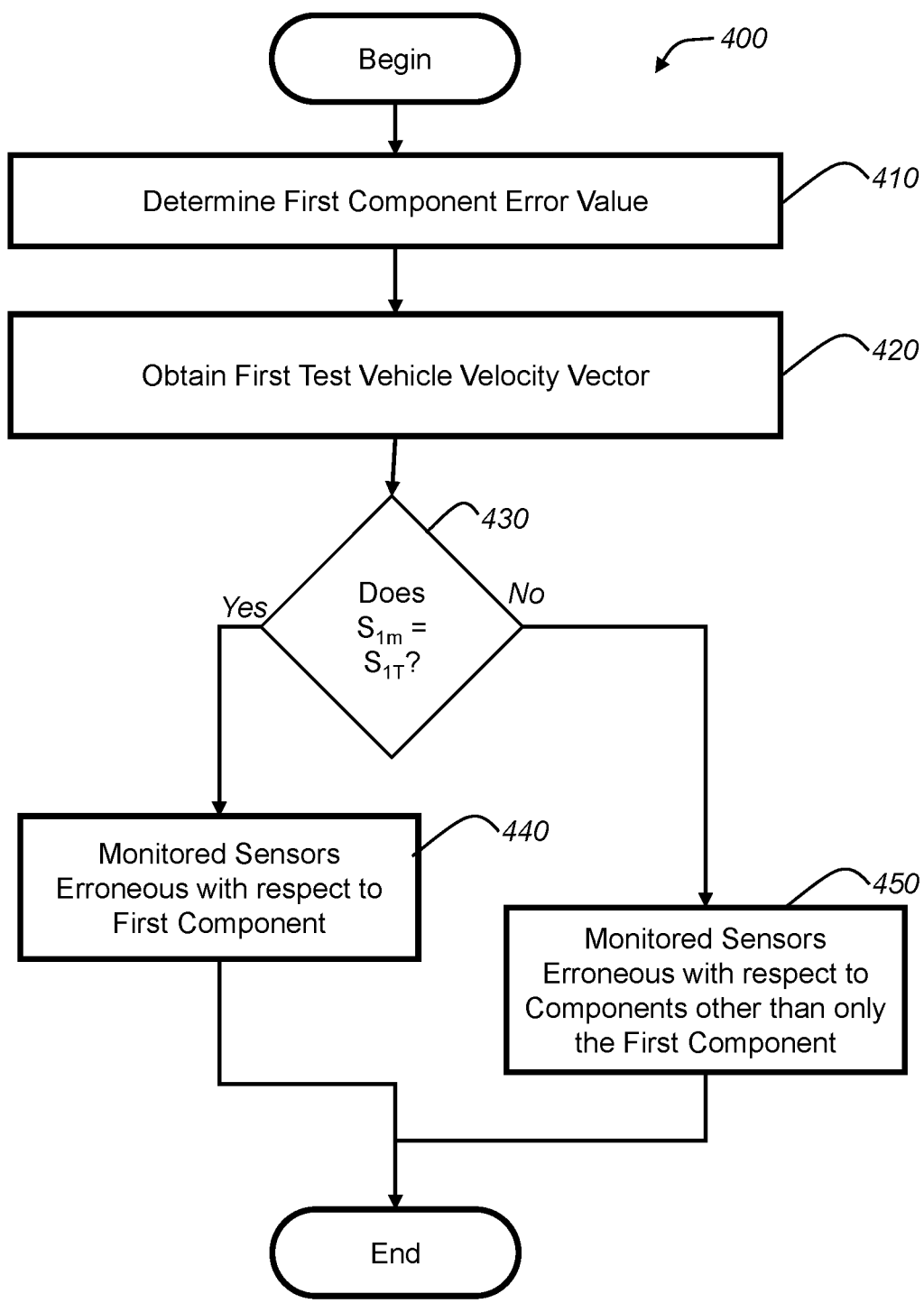
FIG. 5 is a flowchart of an embodiment of a method of testing a first component error.

With reference to FIG. 5, there is shown an embodiment of a method 400 of testing a first component error. In one example, the first component can refer to the azimuth angle $\phi$ and the first component error can correspond to the azimuth angle error $\in_\phi$. The method 400 begins with step 410, wherein a first component error value is determined. The first component error value is a value representing the error in the first component (e.g., azimuth angle) of the monitored sensor velocity vector. In many embodiments, the first component error value is determined based on a first component measured value and a first component corrected value. The first component measured value is derived from the measured sensor velocity vector. The first component corrected value is derived front the vehicle true velocity vector. For example, the first component error value can correspond to $\hat{\in}_\phi$, which can be calculated as $\in_\phi = \phi_m(k_1) - \hat{\phi}(k_1)$, with $\phi_m(k_1)$ being the azimuth angle as measured by the lidar/radar unit 112 and $\hat{\phi}(k_1)$ being the corrected azimuth angle as discussed above. The corrected azimuth angle $\hat{\phi}(k_1)$ is an example of a first component corrected value and the measured azimuth angle $\phi_m(k_1)$ (or $\phi_{1m}$) is an example of a first component measured value. The method 400 continues to step 420.

In step 420, a first test vehicle velocity vector is obtained using the first component error value. In one embodiment, the first test vehicle velocity vector is a vehicle velocity vector that is calculated using the first component error value and assuming that the error in the other components (e.g., ranger) is zero (or negligible). For example, the first test vehicle velocity vector can correspond to $S_{1T}$ of Equation 9. The method 400 continues to step 430.

In step 430, the first test vehicle velocity vector is compared to the first component monitored sensor velocity vector. The first component monitored sensor velocity vector is a monitored sensor velocity vector that is determined based on lidar/radar measurements (or other monitored vehicle sensor measurements) assuming that there exists an error (or a non-negligible error) only in the first component (e.g., azimuth angle). For example, the first test vehicle velocity vector $S_{1T}$ (for testing azimuth) can be compared to $S_{1m}$ and, when it is determined that $S_{1T}=S_{1m}$ (or that the norm of the difference between $S_{1T}$ and $S_{1m}$ is below a threshold amount), then the method 400 can continue to step 440; otherwise, the method 400 continues to step 450.

When the method 400 reaches step 440, it can be determined that the monitored vehicle sensor is erroneous with respect to the first vector component of the vehicle velocity vector (and not any of the other vector components). And, when the method 400 reaches step 450, it can be determined that the monitored vehicle sensor is not erroneous with respect to only the first vector component of the vehicle velocity vector (e.g., error in more than one vector component, no error in the first vector component). Step 440 correspond to a "Yes" for purposes of step 325 (FIG. 4) and step 450 corresponds to a "No" for purposes of step 325.

With reference back to FIG. 4, in step 330, a second component error is tested. The second vector component error refers to an error (or a potential error) in a second one of the vector components of the vehicle velocity vector. The testing of the second component is described in FIG. 6 and is referred to as a method 500.

Figure 6:
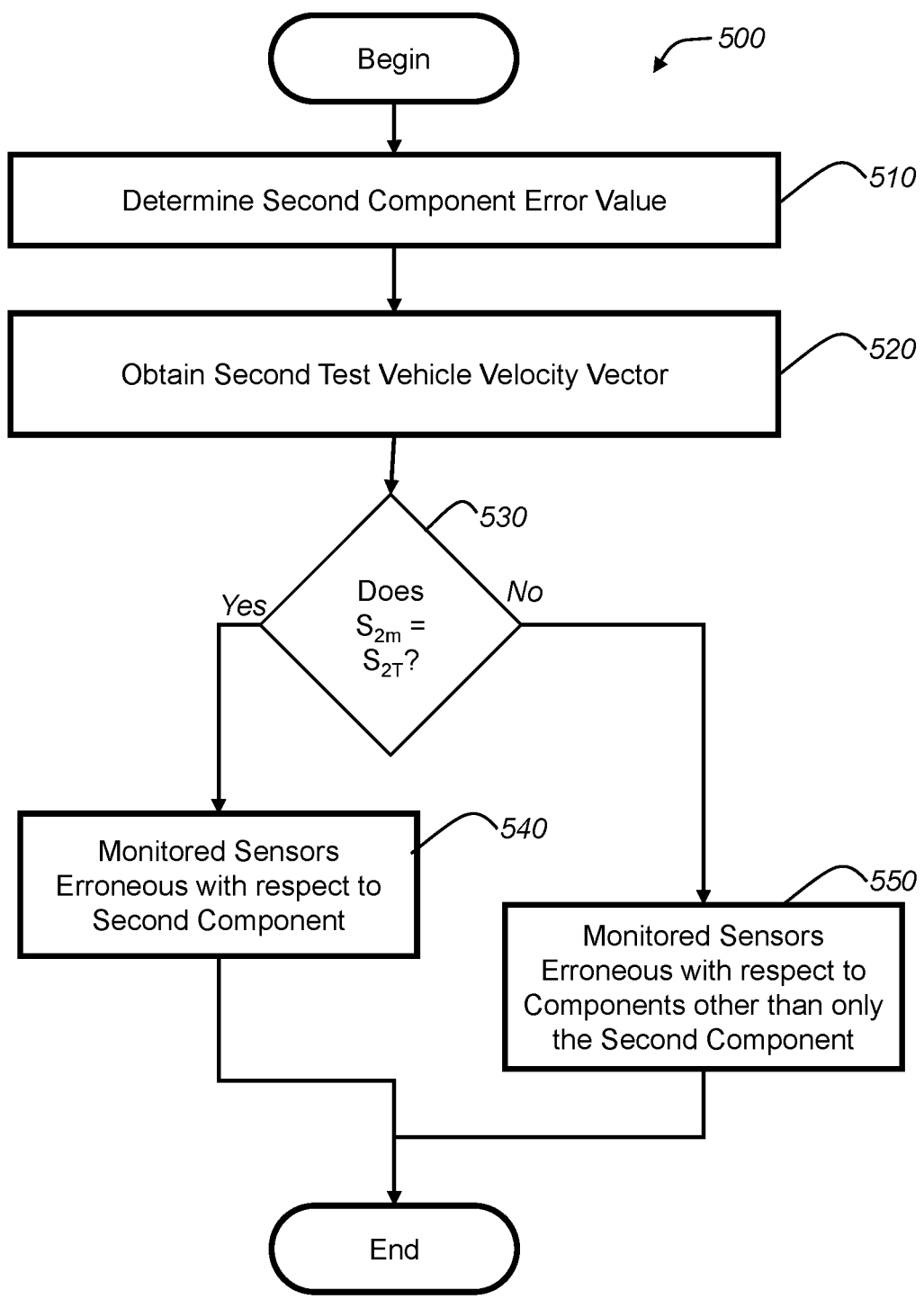
FIG. 6 is a flowchart of an embodiment of a method of testing a first component error.
Figure 7:
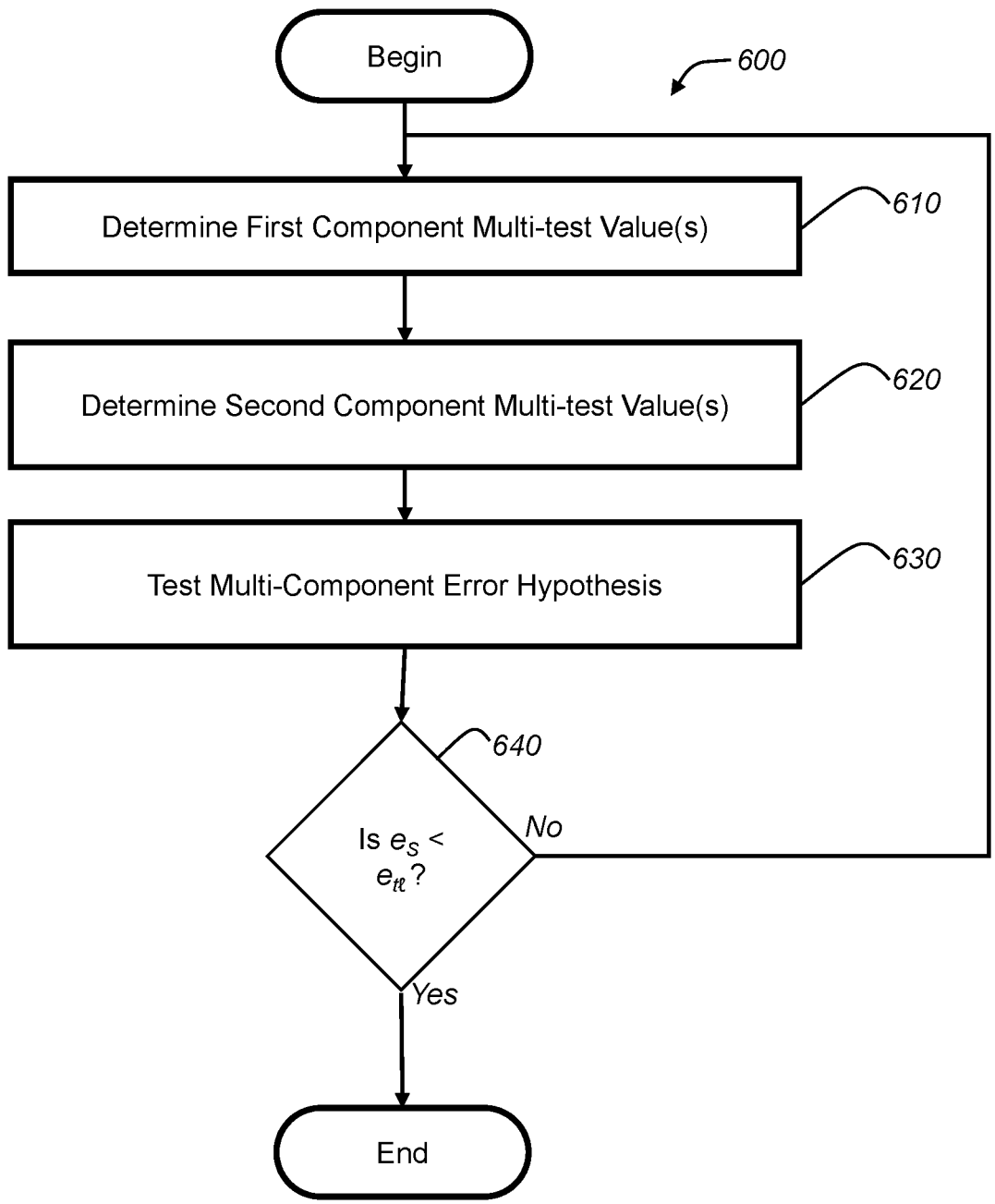
FIG. 7 is a flowchart of an embodiment of a method of carrying out a multi-component error determination process.

With reference to FIG. 6, there is shown an embodiment of a method 500 of testing a second component error. In one example, the second component can refer to the range r and the second component error can correspond to the range error $\hat{\in}_r$. The method 500 begins with step 510, wherein a second component error value is determined. The second component error value is a value representing the error in the second component (e.g., range) of the monitored sensor velocity vector. In many embodiments, the second component error value is determined based on a second component measured value and a second component corrected value. The second component measured value is from the measured sensor velocity vector. The second component corrected value is derived from the vehicle true velocity vector. For example, the second component error value can correspond to $\in_r$, which can be calculated as shown in Equation 13 above. The corrected range $\hat{r}(k_1)$ is an example of a second component corrected value and the measured range $r_{1m}$ is an example of a second component measured value. The method 500 continues to step 520.

In step 520, a second test vehicle velocity vector is obtained using the second component error value. In one embodiment, the second test vehicle velocity vector is a vehicle velocity vector that is calculated using the second component error value and assuming that the error in the other components (e.g., azimuth angle) is zero (or negligible). For example, the second test vehicle velocity vector can correspond to $S_{2T}$ of Equation 14. The method 500 continues to step 530.

In step 530, the second test vehicle velocity vector is compared to the second component monitored sensor velocity vector. The second component monitored sensor velocity vector is a monitored sensor velocity vector that is determined based on lidar/radar measurements (or other monitored vehicle sensor measurements) assuming that there exists an error (or a non-negligible error) only in the second component (e.g., range). For example, the second test vehicle velocity vector $S_{2T}$ (for testing azimuth) can be compared to $S_{2m}$ and, when it is determined that $S_{2T}=S_{2m}$ (or that the absolute value of the difference between $S_{2T}$ and $S_{2m}$ is below a threshold amount), them the method 500 can continue to step 540; otherwise, the method 500 continues to step 550.

When the method 500 reaches step 540, it can be determined that the monitored vehicle sensor is erroneous with respect to the second vector component of the vehicle velocity vector (and not any of the other vector components). And, when the method 500 reaches step 550, it can be determined that the monitored vehicle sensor is not erroneous with respect to only the second vector component of the vehicle velocity vector (e.g., error in more than one vector component, no error in the second vector component). Step 540 correspond to a "Yes" for purposes of step 335 (FIG. 4) and step 550 corresponds to a "No" for purposes of step 335.

With reference back to FIG. 4, step 340 is reached when it has been determined that: (i) there is no error with respect to only the first vector component of the monitored sensor velocity vector (step 325; step 440) and (ii) there is no error with respect to only the second vector component of the monitored sensor velocity vector (step 335; step 540). In many embodiments, step 340 is reached when these two determinations (i) and (ii) are true and when there is determined to be an error in the monitored sensor velocity vector (see step 315). Step 340 can include carrying out a multi-component error determination process, such as that which is described above. In one embodiment, step 340 can be carried out as described in method 600 of FIG. 7.

With reference to FIG. 7, there is shown a method 600 of citifying out a multi-component error determination process. The method 600 (or the multi-component error determination process) operates on the assumption that an error exists with respect to multiple components of the monitored sensor velocity vector. Although the method 600 is described with respect to a monitored sensor velocity vector that is being monitored (or evaluated) to determine errors in two components (e.g., azimuth angle and range), the monitored sensor velocity vector can be monitored with respect to other components, such as elevation angle. And, in such a case, the method 600 can be carried out for any one or more combinations of these components, including azimuth angle and elevation angle; azimuth angle and range; elevation angle and range; azimuth angle, elevation angle, and range.

Method 600 begins with step 610, wherein the first component multi-test value(s) are determined. In one embodiment, this can include estimating the first component value and the second component value at times k+1 and k−1. For example, the ranger and the azimuth angle φ are estimated for times k+1 and k−1. These estimates can correspond to those calculated using Equations 8 and 12 above for times k+1 and k−1. The term $\hat{r}_{k+1}$ can represent the range estimate for time k+1 (or second component next time estimate), the term $\hat{r}_{k-1}$ can represent the range estimate for time k−1 (or second component prior time estimate), the term a $\hat{\phi}_{k+1}$ can represent the azimuth angle estimate (or first component next time estimate), and the term $\hat{\phi}_{k-1}$ can represent the azimuth angle estimate (or first component prior time estimate). Then, once these estimates $\hat{r}_{k+1}$, $\hat{r}_{k-1}$, $\hat{\phi}_{k+1}$, and $\hat{\phi}_{k-1}$ are determined, the derivative range estimate $\dot{r}$ and the derivate azimuth estimate $\dot{\phi}$ is calculated based on these estimates. The derivative range estimate $\dot{r}$ and the derivate azimuth estimate $\dot{\phi}$ can be determined using Equations 3(d) and 3(e) using the estimates $\hat{r}_{k+1}$, $\hat{r}_{k-1}$, $\hat{\phi}_{k+1}$, and $\hat{\phi}_{k-1}$. Using the derivative range estimate $\dot{r}$ and the derivate azimuth estimate $\dot{\phi}$, a new estimate of $\phi(k_1)$ and $\dot{\phi}(k_1)$ is determined. These estimates of $\phi(k_1)$ and/or $\dot{\phi}(k_1)$ can be referred to as the first component multi-test values, as discussed below.

In one embodiment, first a new matrix $X_{1m}$ is calculated using the derivative range estimate $\dot{r}$ and the derivate azimuth estimate $\dot{\phi}$, which can be done so using Equation 6(c). Then, for example, Equation 8 above can be used to determine a new estimate of $\phi(k_1)$ and $\dot{\phi}(k_1)$ using the new matrix $X_{1m}$ (step 620) derived above. These estimates for $\phi(k_1)$ and $\dot{\phi}(k_1)$ can each be referred to as first component multi-test values since these estimates represent values of the first component (e.g., azimuth angle) that are to be tested as a part of the multi-component error determination process. The method 600 continues to step 620.

In step 620, the second component multi-test value(s) are determined. In one embodiment, the second component multi-test value(s) include a new estimate of $r(k_1)$ and $\dot{r}(k_1)$. In one embodiment, this can include calculating a second new matrix $X_{2m}$, which is determined using Equation 10, but where $\phi(k_1)$ is used in place of $\phi_m$ and where $\dot{\phi}(k_1)$ is used in place of $\dot{\phi}_m$. Then, a new estimate of $r(k_1)$ and $\dot{r}(k_1)$ can be calculated using Equations 11 and 12. These estimates $r(k_1)$ and $\dot{r}(k_1)$ can each be referred to as second component values since these estimates represent values of the second component (e.g., range) that are to be tested as a part of the multi-component error determination process. Once these estimates are obtained, then these estimations can be tested to determine whether they represent accurately estimated error values. The method 600 continues to step 630.

In step 630, a multi-component error hypothesis is tested. The multi-component error hypothesis refers to a hypothesis that the present (i.e., current iteration) estimated error values far multiple components (e.g., azimuth angle and range) are accurate (or within a predetermined threshold). In one embodiment, the multi-component tested velocity vector $S_T(k_1)$ is obtained using the estimated values that were determined above: $\phi(k_1)$, $\dot{\phi}(k_1)$, $r(k_1)$, and $\dot{r}(k_1)$. The multi-component tested velocity vector $S_T(k_1)$ can be considered an estimate of the monitored sensor velocity vector $S_m(k_1)$. Then, the difference (or the multi-component velocity vector error) between the monitored sensor velocity vector $S_m(k_1)$ and the multi-component tested velocity vector $S_T(k_1)$ (derived from Equation 7) can be obtained using $S(k_1)-S_m(k_1)=e_S$. Once the multi-component velocity vector error $e_S$ is calculated, then this value can be compared with a vector velocity tolerance limit $e_{1L}$. The method continues to step 640. In step 640, it is determined whether the multi-component velocity vector error is less than a multi-component velocity vector error threshold (e.g., $e_{1L}$). If it is determined that the multi-component velocity vector error is less than a multi component velocity vector error threshold $e_{1L}$ the method 600 continues ends (and the method 300 continues to step 345). Otherwise, the method 600 continues to step 610 where the steps 610 through 660 can be repeated continuously until $e_S < e_{1L}$. In other embodiments, the steps above can be repeated continuously until $e_S \leq e_{1L}$. Once this stopping condition is met, then the latest calculations, of the estimates for $r_1$ and $\phi_1$ are now considered to be sufficiently accurate estimates of the correct $r_1$ and $\phi_1$. These sufficiently accurate estimates can be termed $\hat{r}_{1L}$ for the sufficiently accurate range estimate and $\hat{\phi}_{1L}$ for the sufficiently accurate heading angle estimate. The multi-component velocity vector error $e_S$ of the latest (or last) iteration of the steps 610-660 can be used as the vehicle velocity vector error as discussed below in step 345.

In step 345, a remedial vehicle action is carried out in response to the determined vehicle velocity vector error. Step 345 can be reached in three different ways: from step 325 where an error in only the first vector component of the monitored sensor velocity vector is detected; from step 335 where an error in only the second vector component of the monitored sensor velocity vector is detected; or from step 340 where an error in more than one of the vector components of the monitored sensor velocity vector is detected (e.g., the first and second vector component of the monitored sensor velocity vector). The respective error as tested in step 320, step 330, or step 340 can be considered the vehicle velocity vector error. This vehicle velocity vector error can then be communicated to one or more vehicle modules, such as the other system sensors 14, wireless communications module 30, a user interface 28, etc. In one embodiment, the vehicle velocity vector error is stored in a memory device of the vehicle, such as a memory device operatively connected to the DSP and/or the SP & Decision logic controller 140.

A remedial vehicle action can refer to any vehicle action that is performed in order to address the determined vehicle velocity vector error. For example, modifying parameters used in the lidar/radar unit 112 based on the vehicle velocity vector error can be considered a remedial vehicle action. In this example, one or more parameters that are used in obtaining environmental information using a lidar unit and/or a radar unit can be modified based on the vehicle velocity vector error. For example, if the vehicle velocity vector error reflects an azimuth error of 1°, the remedial vehicle action can include storing lidar adjustment information that results in azimuth angle measurements from the lidar unit being adjusted by the azimuth error of 1°. Other remedial vehicle actions include using the wireless communications module 30 to communicate the vehicle velocity vector error to a backend facility, such as a backend vehicle services facility that is located remotely from the vehicle and accessible via a cellular carrier system, for example. The method 300 then ends.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiments) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more elements or other items, are each to be construed as open-ended, meaning that the listing is not to be considered as excluding other, additional elements or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of carrying out a remedial vehicle action in response to determining an error in a monitored vehicle sensor, the method comprising:

determining a vehicle true velocity vector based on measurements from onboard vehicle sensors;

determining a monitored sensor velocity vector based on measurements from the monitored vehicle sensor, the monitored sensor velocity vector including a plurality of measured vector components;

when it is determined that the vehicle true velocity vector is different than the monitored sensor velocity vector, then testing for a first component error, the first component error being an error in a first measured vector component of the monitored sensor velocity vector, the first measured vector component being one of the plurality of measured vector components, and wherein the testing for the first component error includes:

calculating a first component error value based on a first component measured value and a first component corrected value, wherein the first component measured value is based on the measurements from the monitored vehicle sensor and the first component corrected value is derived from the vehicle true velocity vector;

using the first component error value to obtain a first test vehicle velocity vector;

comparing the first test vehicle velocity vector to a first component monitored sensor velocity vector, the first component monitored sensor velocity vector being derived based on the measurements from the monitored vehicle sensor; and when the first test vehicle velocity vector is within a predetermined threshold amount of the first component monitored sensor velocity vector, then determining that the monitored vehicle sensor is erroneous with respect to the first measured vector component of the monitored sensor velocity vector; and when one or more of the measured vector components of the monitored sensor velocity vector are determined to be erroneous, then carrying out a remedial vehicle action.

2. The method of claim 1, further comprising determining a vehicle velocity vector error to be the first component error value when it is determined that the monitored vehicle sensor is erroneous with respect to the first measured vector component of the monitored sensor velocity vector, and wherein the remedial vehicle action includes adjusting measurements of the monitored vehicle sensor based on the vehicle velocity vector error.

3. The method of claim 1, further comprising the step of when the first test vehicle velocity vector is not within a predetermined threshold amount of the first component monitored sensor velocity vector, then testing for a second component error, the second component error being an error in a second measured vector component of the monitored sensor velocity vector, the second measured vector component being a second one of the plurality of measured vector components.

4. The method of claim 3, wherein either:
the first measured vector component of the monitored sensor velocity vector is an azimuth angle as detected using a lidar unit or a radar unit, and the second measured vector component of the monitored sensor velocity vector is a range as detected using the lidar unit or the radar unit; or
the first measured vector component of the monitored sensor velocity vector is the range as detected using the lidar unit or a radar unit, and the second measured vector component of the monitored sensor velocity vector is the azimuth angle as detected using the lidar unit or a radar unit.

5. The method of claim 3, wherein the testing for the second component error includes:
calculating a second component error value based on a second component measured value and a second component corrected value, wherein the second component measured value is based on the measurements from the monitored vehicle sensor and the second component corrected value is derived from the vehicle true velocity vector;

using the second component error value to obtain a second test vehicle velocity vector;

comparing the second test vehicle velocity vector to a second component monitored sensor velocity vector, the second component monitored sensor velocity vector being derived based on the measurements from the monitored vehicle sensor; and when the second test vehicle velocity vector is within a second predetermined threshold amount of the second component monitored sensor velocity vector, then determining that the monitored vehicle sensor is erroneous with respect to the second measured vector component of the monitored sensor velocity vector.

6. The method of claim 5, further comprising the step of when the first test vehicle velocity vector is not within a predetermined threshold amount of the first component monitored sensor velocity vector and when the second test vehicle velocity vector is not within a second predetermined threshold amount of the second component monitored sensor velocity vector, then carrying out a multi-component error determination process.

7. The method of claim 6, wherein the multi-component error determination process includes:
estimating a first component multi-test value and a second component multi-test value; and testing a multi-component error hypothesis, wherein the testing of the multi-component error hypothesis includes: (i) obtaining a multi-component velocity vector error based on the first component multi-test value and the second component multi-test value, and (ii) determining whether the multi-component velocity vector error is less than a multi-component velocity vector error threshold.

8. The method of claim 7, wherein the first component multi-test value and/or the second component multi-test value are derived based on a first component next time estimate, a first component prior time estimate, a second component next time estimate, and a second component prior time estimate.

9. The method of claim 7, wherein when it is determined that the multi-component velocity vector error is less than the multi-component velocity vector error threshold, determining that a vehicle velocity vector error to be the multi-component velocity vector error, wherein the multi-component velocity vector error includes a first error value corresponding to the first measured vector component of the monitored sensor velocity vector and a second error value corresponding to the second measured vector component of the monitored sensor velocity vector.

10. The method of claim 1, wherein the onboard vehicle sensors include a vehicle speed sensor and a vehicle heading angle sensor.

11. The method of claim 10, wherein the monitored vehicle sensor is a vehicle environment sensor.

12. The method of claim 11, wherein the vehicle environment sensor includes either or both of a lidar unit and a radar unit.

13. The method of claim 12, wherein a first component estimate matrix is derived from the vehicle true velocity vector and measurements from the monitored vehicle sensor, the first component estimate matrix including or being used to derive the first component corrected value.

14. A vehicle failure detection system, comprising:
a system under monitoring (SUM) that includes one or more vehicle environment sensors;
one or more onboard vehicle sensors, the onboard vehicle sensors being separate from the one or more vehicle environment sensors;
a failure detection module that includes:
a failure detection system (FDS) signal processor; and
a memory containing a computer program; and
a communication link between the failure detection model and the SUM;
wherein the failure detection module is configured to execute the computer program that is stored in the memory of the vehicle failure detection system using the failure detection signal processor, and wherein execution of the computer program by the failure detection signal processor causes the failure detection module to:
determine a vehicle true velocity vector based on measurements from the one or more onboard vehicle sensors;
determine a monitored sensor velocity vector based on measurements from the one or more vehicle environment sensors, the monitored sensor velocity vector including a plurality of measured vector components;
when it is determined that the vehicle true velocity vector is different than the monitored sensor velocity vector, then test for a first component error, the first component error being an error in a first measured vector component of the monitored sensor velocity vector, the first measured vector component being one of the plurality of measured vector components, wherein the testing for the first component error includes calculating a first component error value based on a first component measured value and a first component corrected value, and wherein the first component measured value is derived based on the measurements from the vehicle environment sensors and the first component corrected value is derived from the vehicle true velocity vector; and
perform a remedial vehicle action in response to the detection of an error in the one or more vehicle environment sensors.

15. The vehicle failure detection system of claim 14, wherein the one or more vehicle environment sensors include either or both of a lidar unit and a radar unit.

16. The vehicle failure detection system of claim 15, wherein the one or more onboard vehicle sensors are either or both of system sensors or supplemental sensors, wherein the supplemental sensors are a part of the failure detection module, and wherein the system sensors are either or both of sensors included as a part of the SUM or other system sensors.

17. The vehicle failure detection system of claim 16, wherein the one or more onboard vehicle sensors include a vehicle speed sensor and a vehicle heading angle sensor.

18. The vehicle failure detection system of claim 14, wherein the communication link is a direct, hardwired connection between the failure detection model and the SUM.

19. The vehicle failure detection system of claim 14, wherein the communication link is a vehicle communications bus.

* * * * *